(12) United States Patent
Merten et al.

(10) Patent No.: US 8,402,253 B2
(45) Date of Patent: Mar. 19, 2013

(54) MANAGING MULTIPLE THREADS IN A SINGLE PIPELINE

(75) Inventors: Matthew Merten, Hillsboro, OR (US); Avinash Sodani, Portland, OR (US); James Hadley, Portland, OR (US); Alexandre Farcy, Hillsboro, OR (US); Iredamola Olopade, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1452 days.

(21) Appl. No.: 11/540,307

(22) Filed: Sep. 29, 2006

(65) Prior Publication Data

US 2008/0082796 A1    Apr. 3, 2008

(51) Int. Cl.
*G06F 7/38* (2006.01)
*G06F 9/00* (2006.01)
*G06F 9/44* (2006.01)
*G06F 15/00* (2006.01)

(52) U.S. Cl. ...................................................... 712/220
(58) Field of Classification Search .................. None
See application file for complete search history.

(56) References Cited

U.S. PATENT DOCUMENTS

| 6,609,193 | B1 | 8/2003 | Douglas et al. ............... 712/219 |
| 2005/0007164 | A1 | 1/2005 | Callahan ........................ 712/239 |
| 2005/0138290 | A1 | 6/2005 | Hammarlund et al. ........ 711/118 |
| 2005/0149689 | A1 | 7/2005 | Sodani et al. ..................... 712/1 |

OTHER PUBLICATIONS

Dorai et al; Transparent Threads: Resource Sharing in SMT Processors for High Single-Thread Performance; 2002; IEEE.*
Shen et al; Modern Processor Design: Fundamentals of Superscalar Processors, Beta Edition; 2003; McGraw Hill; pp. 450-456.*

* cited by examiner

*Primary Examiner* — Corey S Faherty
(74) *Attorney, Agent, or Firm* — Trop, Pruner & Hu, P.C.

(57) ABSTRACT

In one embodiment, the present invention includes a method for determining if an instruction of a first thread dispatched from a first queue associated with the first thread is stalled in a pipestage of a pipeline, and if so, dispatching an instruction of a second thread from a second queue associated with the second thread to the pipeline if the second thread is not stalled. Other embodiments are described and claimed.

18 Claims, 6 Drawing Sheets

MANAGING MULTIPLE THREADS IN A SINGLE PIPELINE

BACKGROUND

Modern microprocessors provide support for execution of multiple software threads within the processor at a single time. As an example, some processors may allow two software threads to use the same processor pipeline by interleaving instructions or micro-operations (μops) in the pipeline stages. Some processors may have their pipeline architecture broken up into several sub-pipelines, each associated with a given task, such as instruction decode, allocation, and so forth.

In some architectures, one or more such sub-pipelines may be stalling, in that if a given instruction or μop needs a particular resource or resources, the associated instruction or μop may stall in a given pipestage of the sub-pipeline until the needed resource become available. By stalling the pipeline, forward progress of other instructions or μops behind the stalled one are also prevented from making forward progress. Accordingly, in some architectures, an entire sub-pipeline may be replicated from a beginning buffer to an ending buffer, along with all pipestages there between. However, such replication consumes significant hardware.

DETAILED DESCRIPTION

In various embodiments, one or more pipeline sections within a pipelined processor may allow multiple threads to use a common pipeline via interleaving of instructions or micro-operations (μops) in stages of the pipeline section. Such sharing or interleaving of μops may take place in a pipeline section that includes a minimal amount of redundant hardware, reducing chip area and power consumption. Because circuitry within the pipeline, e.g., logic (also referred to herein as a pipestage), may be shared with a single thread using the pipestage at a given time, embodiments may implement various clearing and redispatch operations to resolve blocking conditions if a thread should become stalled within a pipestage of the pipeline section. Note while described herein as handling μops, other implementations may be used to handle instructions of multiple threads.

Embodiments of the present invention may be implemented in various pipelined processor architectures. Furthermore, different pipeline portions of a pipelined processor may implement embodiments. For example, in some implementations an instruction decode pipeline may implement an embodiment. Furthermore, embodiments may be implemented in an allocation pipeline, such as a back end allocation unit, among other such units.

Figure 1:
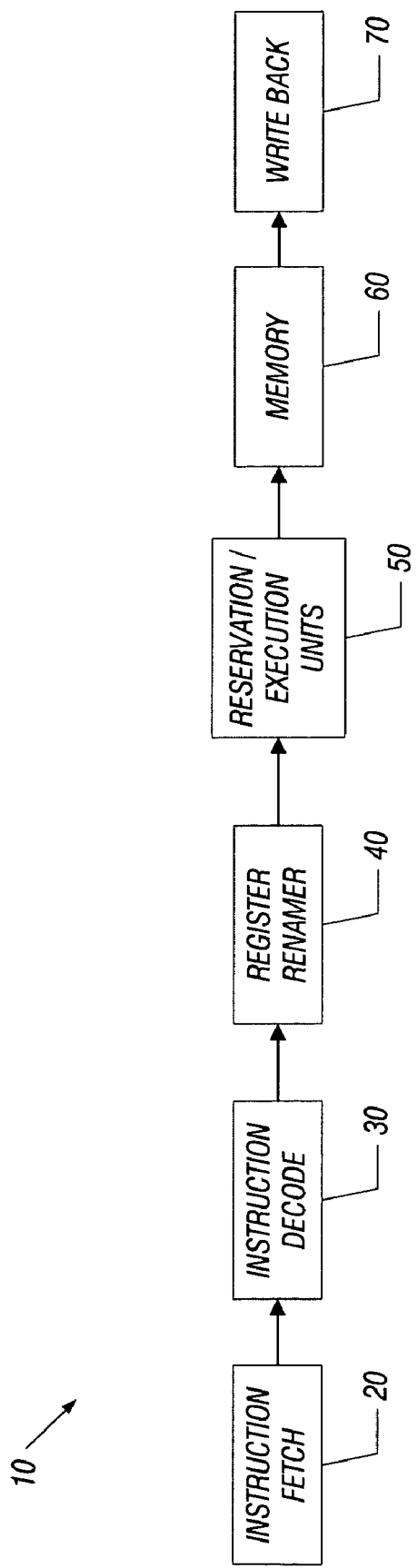
FIG. 1 is a block diagram of a processor in accordance with one embodiment of the present invention.

Referring now to FIG. 1, shown is a block diagram of a processor in accordance with one embodiment of the present invention. As shown in FIG. 1, processor 10 may be a multi-stage pipeline processor. Note that while shown at a high level in FIG. 1 as including six stages, it is to be understood that the scope of the present invention is not limited in this regard, and in various embodiments many more than six such stages may be present. Further, each stage may itself be formed of multiple units such as a sub-pipeline including one or more pipestages. As shown in FIG. 1, the pipeline of processor 10 may begin at a front end with an instruction fetch stage 20 in which instructions are fetched from, e.g., an instruction cache or other location.

From instruction fetch stage 20, data passes to an instruction decode stage 30, in which instruction information is decoded, e.g., an instruction is decoded into sops. From instruction decode stage 30, data may pass to a register renamer stage 40, where data needed for execution of an operation can be obtained and stored in various registers, buffers or other locations. Furthermore, renaming of registers to associate limited logical registers onto a greater number of physical registers may be performed.

Still referring to FIG. 1, when needed data for an operation is obtained and present within the processor's registers, control passes to a back end stage, namely reservation/execution units 50, which may be used to assign an execution unit for performing the operation and provide the data to the execution unit. Upon execution, the resulting information is provided to a memory stage 60, which may store the information, e.g., in various buffers, until a write back stage 70 writes back the data, e.g., to lower levels of a memory hierarchy, such as lower levels of a cache memory, a system memory coupled thereto, or an architectural register file.

While the scope of the present invention is not limited in this regard, in various embodiments a pipeline may include a combination of shared pipeline resources as well as one or more dedicated storages that can be dedicated to a given thread. In this way, one thread may have instructions progress through the pipeline. If a second thread has unstalled available instructions, they may begin traversing of the pipeline through the various pipestages, possibly interleaved with those of the first thread, or possibly beginning when the first thread becomes stalled. In so doing, the second thread's instructions may overwrite the first thread's instructions in the various shared resources of the pipeline. However, when instructions of the first thread are cleared and overwritten from within pipestages, a pointer within a front end storage associated with the first thread may be updated to indicate the point at which instructions of that thread are to be redispatched on overcoming the stall condition. In this way, multiple threads may make forward progress through the pipeline while using shared resources of the pipeline. Still further, within the pipeline, dedicated storages may exist such that a stalled thread's instruction or instructions may be stored in the dedicated storage so that upon resolution of the stall, these stored instructions need not be re-dispatched from the front end storage, reducing latency of execution. Thus, each thread may make forward progress without the other thread blocking it out, effectively starving it from use of the pipeline. In various embodiments, a single pipeline may have some stages with shared storage and other stages with dedicated storage.

Figure 2:
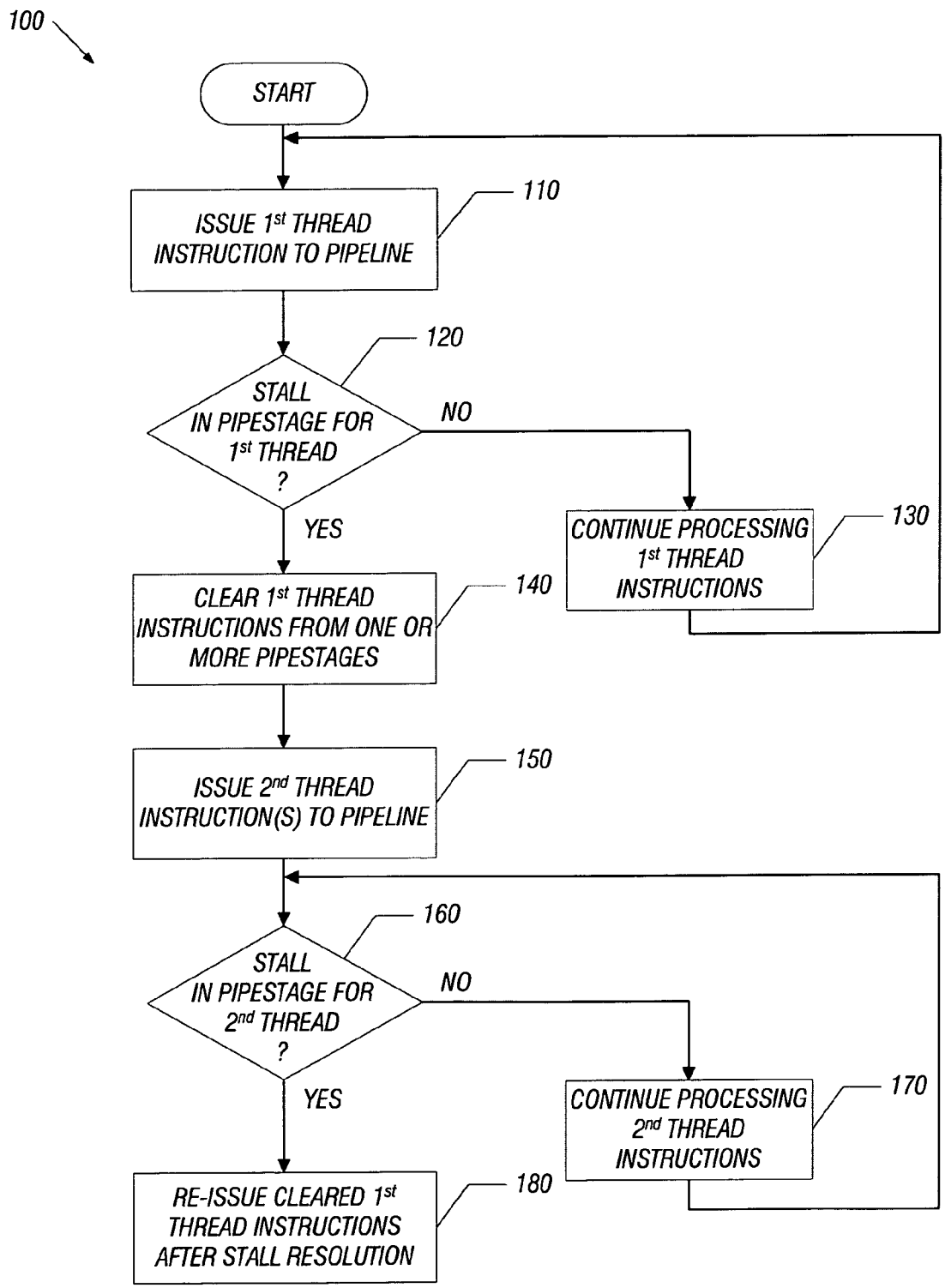
FIG. 2 is a flow diagram of a method in accordance with one embodiment of the present invention.

Referring now to FIG. 2, shown is a flow diagram of a method in accordance with one embodiment of the present invention. As shown in FIG. 2, method 100 may be implemented in a pipeline to enable multiple threads to progress through the pipeline. While the scope of the present invention is not limited in this regard, in one embodiment the pipeline may be an instruction decode unit, a back end allocation unit or another such pipeline. Furthermore, as will be described further below, the pipeline may include shared resources (referred to as pipestages) having shared storages or latches therebetween. The pipeline also may include one or more redundant or thread-specific storages, such as a front end thread-specific storage for each of multiple threads, and one or more replicated storages or latches between pipestages or within portions of a pipestage. Method 100 may be used to navigate instructions of multiple threads through the pipeline and to allow forward progress in the presence of stalls. Furthermore, method 100 may be used to detect a stall or blockage condition, for example, based on current owner information, incoming thread and stall presence. Based on such information, a stall may be detected and a decision made whether to clear and/or drop one or more instructions of such a stalled thread from one or more pipestages of the pipeline. Then, to recover such instructions that may have been dropped, a recovery mechanism may be provided to accurately identify and re-dispatch previously dropped instructions.

Referring to FIG. 2, method 100 may begin by issuing a first thread instruction (or instructions) to a pipeline (block 110). For example, a first thread may have instructions or μops stored in an instruction decoded queue (IDQ). Understand that while described at a higher level in FIG. 2 as applying to instructions generally, in some implementations, e.g., for an instruction decode pipeline, μops may be handled. Instructions may be sent from the IDQ through a multiplexer to a first pipestage for processing. The instructions may continue passing through the pipeline, for example, through a shared latch between the first pipestage and a second pipestage for still further processing and so on. While not shown in the high level flow of FIG. 2, understand that in many embodiments instructions from the first thread may be interleaved with instructions from a second thread.

During processing of the instruction(s) through the pipeline, it may be determined whether a stall has occurred in a pipestage with respect to the first thread (diamond 120). If no stall is detected in the pipeline at diamond 120, control may pass to block 130 where processing of the first thread's instructions may continue. Thus, control may pass back to block 110 for additional issuance of instructions of the first thread. Various events may cause a stall to occur, however. For example, such a stall may occur when a resource needed by an instruction is not available. As one example, a load or store buffer to be used with the instruction may be full or otherwise unavailable. Or as a further example, one or more operands to be used by the instruction may be unavailable. Similarly, a stall may occur in an earlier pipestage due to a stall occurring in a later pipestage. Accordingly, execution of this thread is stalled until the needed resource is available.

To prevent loss of valuable processor cycles when such a stall occurs, method 100 may pass control from diamond 120 to block 140. At block 140, one or more instructions of the first thread may be cleared from pipestages of the pipeline. Different factors may be considered in determining whether one or more instructions should be cleared. For example, in some implementations, a current owner of the pipestage, the identification of the incoming thread, and stall status may be considered in determining whether to clear one or more instructions of a given thread. For example, assume that the stall occurs in a third pipestage and that several younger instructions of the same thread are in the earlier pipestages (i.e., pipestages one and two). In this instance, in the embodiment of FIG. 2 all of these instructions may be cleared from the pipestages. Furthermore, while not shown in FIG. 2, a read pointer of the IDQ that points to the next instruction to be read therefrom may be moved back to point to the stalled instruction so that upon redispatch when the stall has been cleared, the proper instruction may be issued. Note that in various implementations, different protocols may exist for navigating the pipeline.

For example, one protocol may dictate that a thread that is stalled at the head of the pipeline hold instructions in other stages in place, meaning that they cannot move forward even if the stage in front of them is empty. Thus only an unstalled thread can move forward, causing clearing of instructions from the other thread in shared storages. Yet other protocols may allow movement forward into empty stages even if the thread is stalled at the end of the pipeline to collapse bubbles, but not to allow clearing of the other thread by movement into a stage occupied by a stalled other thread (so a stalled thread cannot cause clearing of another stalled thread). Yet another protocol may allow one thread to move forward even if the thread is stalled and that thread does not occupy the next pipestage downstream. This might cause an instruction actually stuck in the next pipeline stage to be dropped (and thus a stalled thread can cause dropping of another stalled thread). Accordingly, part of determining the presence of a stall in diamond 120 may include determining what to do with an instruction that is incoming to a pipestage (e.g., accept or block) and what to do with an instruction present in a pipestage that is blocked and will have to be dropped. In each of these example protocols, instructions from a stalled thread do not overwrite instructions from the same thread stalled in a pipestage downstream, as this would violate ordering, although other protocols with other recovery mechanisms might do otherwise. Note that a single pipeline may have multiple stages, each with different protocols.

Still referring to FIG. 2, to enable efficient processing control may pass from block 140 to block 150, where one or more instructions of the second thread may be issued to the pipeline. That is, an IDQ associated with the second thread may read out one or more instructions of the second thread to the pipeline to enable processing of such instructions. During processing of the instruction(s) through the pipeline, it may be determined whether a stall has occurred with respect to the second thread (diamond 160). If no stall is detected in the pipeline with regard to the second thread at diamond 160, control may pass to block 170 where processing of the second thread's instructions may continue. Thus, control may pass back to block 150 for issuance of another instruction of the second thread.

Referring still to FIG. 2, when it is determined that the stall of the first thread has been cleared, control passes to block 180, where the cleared instructions of the first thread may be re-issued after stall resolution. Thus, because the needed resource(s) may now be available (for example), the previously issued instructions may be re-read from the IDQ and sent along the pipeline for processing. As will be described further below, various pointer mechanisms may be used to appropriately redispatch instructions to the pipeline.

While described with this particular implementation in the embodiment of FIG. 2, it is to be understood the scope of the present invention is not limited in this regard. For example, note that FIG. 2 may represent basic operation of clear and redispatch implementations, as when a stall is detected various instructions of the stalled thread may be cleared to enable issuance and processing of a different thread's instructions. However, in other implementations some amount of the original thread's instructions may remain in the pipeline, if possible, so as to not require re-execution at a later time.

Figure 3:
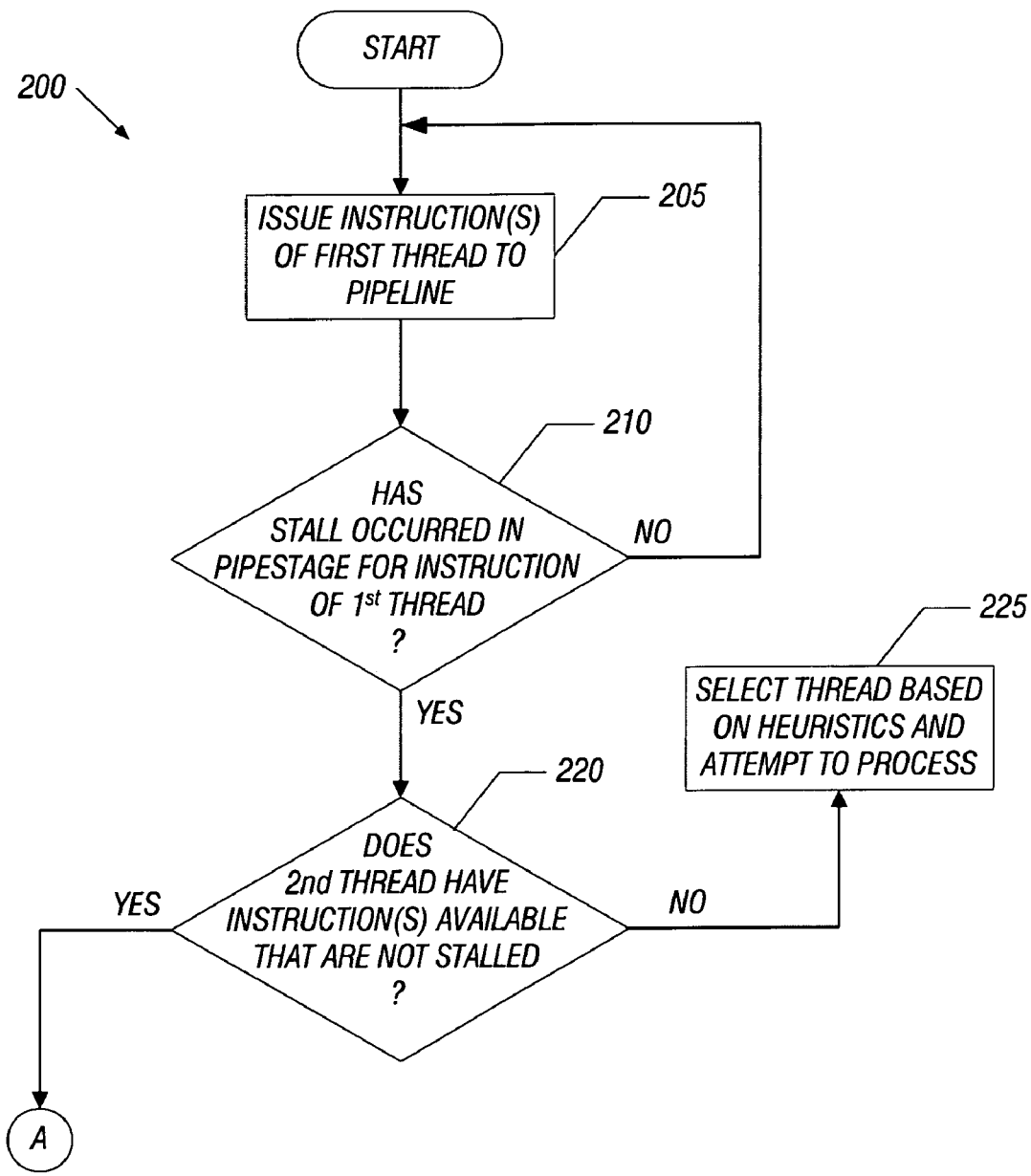
FIG. 3 is a flow diagram of a method in accordance with another embodiment of the present invention.

Referring now to FIG. 3, shown is a flow diagram of a method in accordance with another embodiment of the present invention. Method 200 may be used to handle multiple threads within a single shared pipeline. More specifically, in the embodiment of FIG. 3 a stalled thread may not necessarily be cleared from all stages of a pipeline such that after stall resolution, fewer than all previously stalled instructions of the thread may need to be redispatched.

As shown in FIG. 3, method 200 may begin by issuing instruction(s) of a first thread to a pipeline (block 205). As described above, in some implementations a thread-specific IDQ may read one or more instructions of a first thread out to the pipeline as pointed to by a read pointer of the IDQ. During processing of the one or more instructions of the first thread in the pipeline, it may be determined at diamond 210 whether a stall has occurred in a pipestage. If not, control passes back to block 205 for continued issuance and processing of the first thread instructions.

If instead at diamond 210 it is determined that a stall has occurred, control passes to diamond 220. At diamond 220 it may be determined whether a second thread has one or more instructions available for issuance that are not stalled. That is, a thread-specific IDQ for a second thread may be checked to determine whether a read pointer of the queue is pointing to a valid instruction for issuance that itself is not stalled. Note that if this second thread does not have such instructions available, control may pass to block 225. At block 225, a selection may be made to attempt to continue processing the first thread or attempt processing of the second thread. In various embodiments, the selection may be made based on heuristics that indicate which thread is likely to become unstalled first. For example, the determination may be made based on the type of stall, resource needed, and so forth. Accordingly, if a stall has not been resolved the pipeline may be stalled until the first or second thread can make forward progress, such as when a needed resource becomes available.

Figure 4:
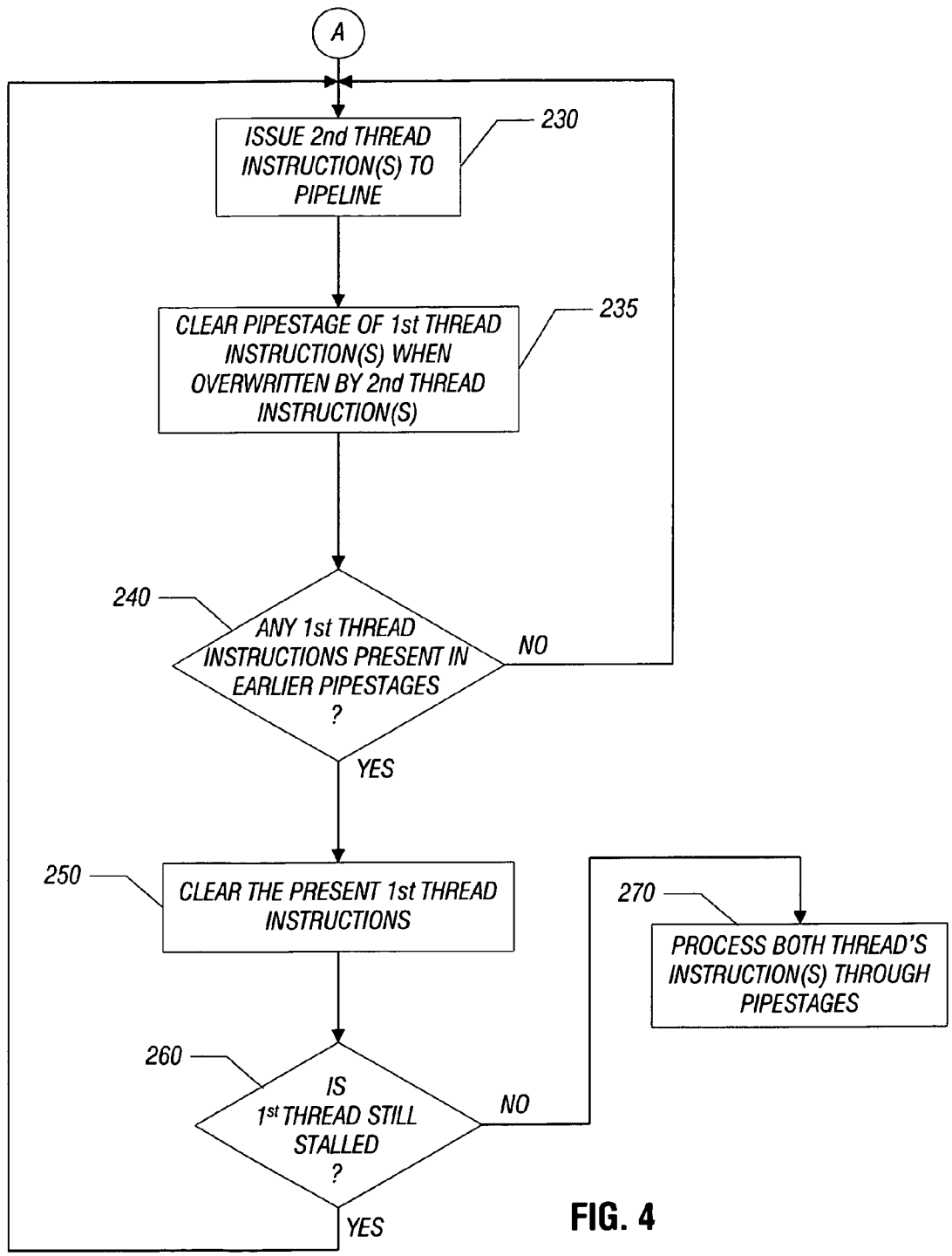
FIG. 4 is a continuation of the flow diagram of FIG. 3.

Referring still to FIG. 3, if instead it is determined at diamond 220 that the second thread has available instructions, control passes to block 230 of FIG. 4 (via circle A) for issuance of one or more instructions of the second thread to the pipeline. Thus, the IDQ associated with the second thread may issue one or more instructions according to a read pointer of the IDQ. These instructions may thus progress down the pipestages of the pipeline. As part of traversing of the pipeline, such as passing of a second thread instruction into a first shared latch of the pipeline, a clear signal may be generated to clear the associated pipestage of the first thread instruction, and thus a first thread instruction may be overwritten with this instruction of the second thread (both block 235). That is, a clear signal may be sent to a given pipestage of the pipeline to clear that resource of an instruction of the first thread. As a result, the read pointer of the IDQ associated with the first thread may be reset to point back to this cleared instruction.

From block 235, control passes to diamond 240. At diamond 240 it may be determined whether any first thread instructions are present in earlier pipestages. That is, when a later pipestage is cleared of a first thread instruction, any later-issued (i.e., younger) instructions of the first thread may also be cleared from various earlier pipestages (block 250). In this way, when the first thread becomes unstalled, processing of the first thread instructions may proceed in the proper order. If instead at diamond 240 it is determined that no first thread instructions are present in earlier pipestages, control passes back to block 230 for continued execution of the second thread, as described above. Thus as instructions progress down the pipeline, they may encounter instructions from the stalled first thread in subsequent pipestages that also then get cleared from the pipestages.

Control passes from block 250 to diamond 260. At diamond 260 which may occur during handling of the second thread's instructions in the pipeline, it may be determined whether the first thread remains stalled. If so, processing of the second thread may continue, with control returning back to block 230. Thus a next pipestage may be cleared of a first thread instruction when overwritten by a second thread instruction. Note that by this successive overwriting and clearing of first thread instructions there may be less redispatching needed, as when the first thread becomes unstalled, one or more instructions previously processed and remaining in a pipestage (or buffer) may continue along the pipeline.

Note that if at diamond 260 it is determined that the first thread is no longer stalled, both threads may proceed from their current locations through the various pipestages of the pipeline (block 270). Accordingly, if some previously processed first thread instructions remain in later pipestages, they may continue their traversing of the pipeline without the need for redispatching. Furthermore, second thread instructions behind such first thread instructions may also continue traversing the pipeline, thus enabling forward progress of both threads. While described with this particular implementation in the embodiments of FIGS. 3 and 4, the scope of the present invention is not limited in this regard.

Figure 5:
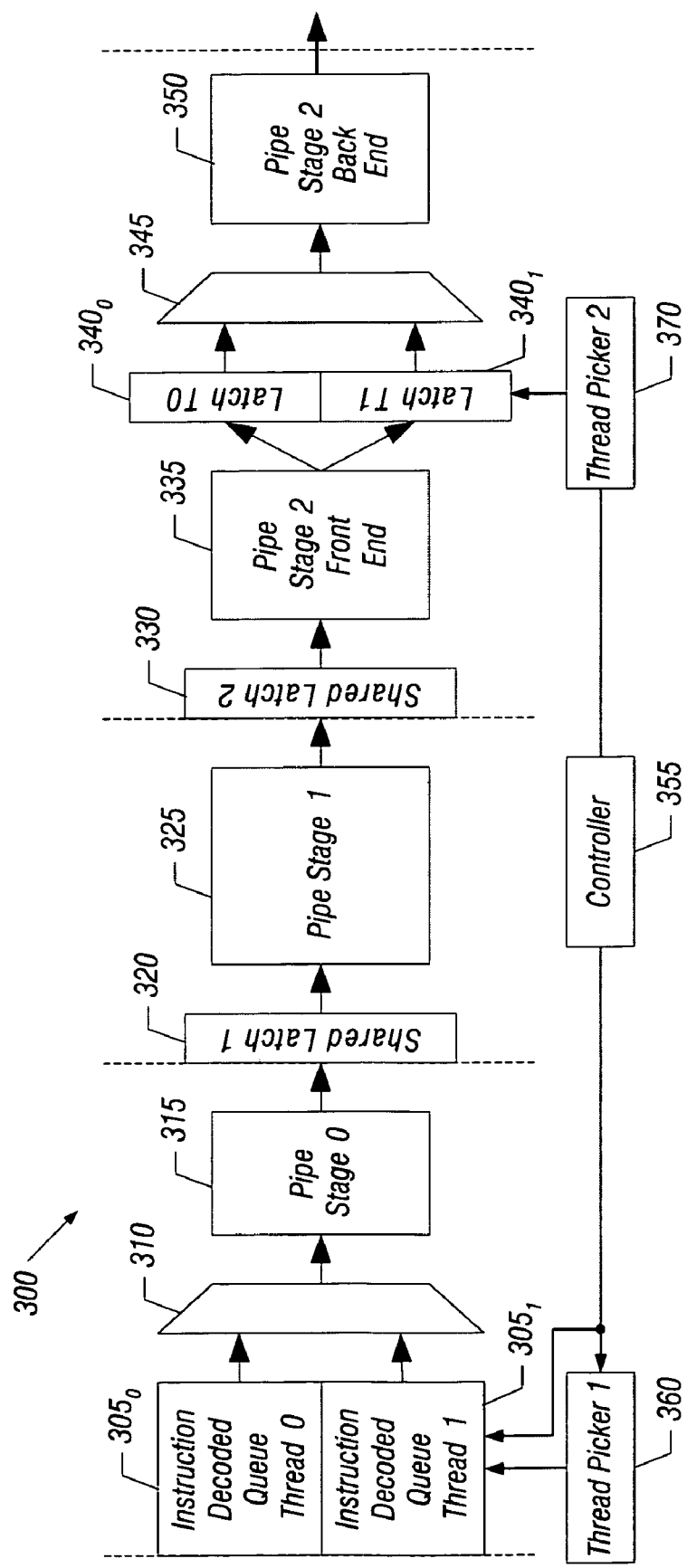
FIG. 5 is a block diagram of a pipeline in accordance with one embodiment of the present invention.

Referring now to FIG. 5, shown is a block diagram of a pipeline in accordance with one embodiment of the present invention. As shown in FIG. 5, pipeline 300 may be a sub-pipeline of a pipelined processor, such as an instruction decode unit, an allocator unit or another such processing unit. As shown in FIG. 5, pipeline 300 may begin with a storage for incoming instructions, which may be decoded instructions such as μops or other decoded instructions or instruction bytes. In the embodiment of FIG. 5, a first thread queue $305_0$ and a second thread queue $305_1$ (generically queue 305) may be present. Each queue 305 may store incoming decoded instructions in entries of the queue. Further, while shown as separate storages in the embodiment of FIG. 5, in other implementations a single shared storage may be present. However, in any event queue 305 may include dedicated storage for instructions of multiple threads. Furthermore, while shown with two such queues in the embodiment of FIG. 5, the scope of the present invention is not limited in this regard, and in other implementations more than two such queues may be present.

Each queue 305 may include multiple pointers to point to various locations or entries within the queue. For example, in one embodiment each queue 305 may include a read pointer and multiple other pointers each to point to a location within the queue that corresponds to an instruction present in another location within pipeline 300. For example, each of these pointers may be associated with a particular pipestage, latch or other structure within pipeline 300. If an instruction of the given thread associated with queue 305 is present in the structure corresponding to the pointer, the pointer may indicate the presence of that instruction in the given structure. For example, assume that a μop A progressed down the pipeline and resides in a storage 320 of pipeline 300. A pointer within queue 305 associated with storage 320 may point to μop A. Accordingly, based on this information, queue 305 may maintain μop A in an entry based on information in the pointers, in addition to possibly other information, until μop A has successfully passed through pipeline 300. After this time, the entry within queue 305 for μop A may be invalidated and thus evicted. In other embodiments, instead of including a pointer for every structure (e.g., at least latch) within pipeline 300, each queue 305 may include a read pointer and a selected set of pointers to point to some amount of the structures within pipeline 300.

Note that in other implementations, a storage separate from the queue itself may store instructions as they progress through the pipeline. That is, by moving a copy into a side storage as a μop is sent down the pipeline, on a clear the read pointer is moved to point into the side storage. Then if redispatch is necessary, another copy is read from the side buffer and sent down the pipeline. The read pointer would progress through the copies in the side storage, and continue back in the main queue when all of the μops in the side storage are re-processed.

When an instruction is selected for reading or output from a given queue 305, it is passed to a multiplexer 310, which may select an output instruction from either first queue $305_0$ or second queue $305_1$ for passing to a first pipestage (pipestage 0) 315. First pipestage 315, as with other pipestages within pipeline 300, may include various logic circuitry to perform processing on incoming instructions. In various implementations, an entire entry (e.g., 4 μops) may be sent at a time from a given one of queues 305. Such instructions may pass through multiplexer 310 and be processed, e.g., in a single cycle in first pipestage 315. After processing in pipestage 315, an instruction may be output to a first shared latch 320. First shared latch 320 may include storage for one or more instructions, e.g., corresponding to a width of an entry in queue 305. However, first shared latch 320 may be larger or smaller than the line size of queue 305. First pipestage 315 may break a μop into two smaller μops, for example. Or first pipestage 315 may process as many μops as first shared latch 320 can hold, and then take (potentially) multiple cycles to process the remaining μops. Furthermore, it is to be understood that first shared latch 320 may be shared in that either an instruction of the first thread or the second thread may be stored within first shared latch 320. Note that in various implementations, in addition to storage for such sops, first shared latch 320 may include a state portion that may include, at least, a single state bit associated with each μop so as to identify valid/invalid μops. That is, if a given thread becomes stalled and is to be cleared from a pipestage, the status bits associated with that thread may be reset to an invalid state to so indicate.

From shared latch 320, instructions traverse to a second pipestage (pipestage 1) 325, where additional processing may be performed. The output of second pipestage 325 may be coupled to a second shared latch 330, which may be a latch having a structure similar to that of first shared latch 320. In one embodiment, only μops from unstalled threads may move forward from first shared latch 320 through second pipestage 325 into second shared latch 330, and thus cause clearing of a stalled thread there. In one embodiment, μops stalled in first shared latch 320 may not move forward into second pipestage 325 if stalled, even if second shared latch 330 is empty or will become empty. Furthermore, μops from a stalled thread may be read from queue 305, processed through first pipestage 315, and be written into first shared latch 320, thus clearing μops from a stalled other thread in that latch (thus a stalled thread can advance and clear another stalled thread).

Referring still to the embodiment of FIG. 5, the output of second shared latch 330 may be coupled to a front end pipestage 335 (pipestage 2 front end) of a third pipestage. Some stalls may be detected in pipestage 335 that cause stalls and prevent μops from progressing down the pipeline. Note that the output of front end pipestage 335 may be coupled to both a first thread latch $340_0$ and a second thread latch $340_1$ (generically thread latch 340). That is, replicated latches may be present at an output of front end pipestage 335. Thus depending on which thread's instruction is being processed, the output of front end pipestage 335 may be passed to a selected one of latches 340. In this way, instructions of both threads may be stored simultaneously. Furthermore, if one thread should stall in thread latch 340 (e.g., due to resources needed before progressing through a back end of this pipestage), the instruction(s) of the stalled thread may remain in its associated latch, while instruction(s) of the unstalled thread may traverse its dedicated thread latch so that forward progress continues. Note that μops stalled in thread latch 340 may cause μops from the same thread in second shared latch 330 to also stall since they cannot move forward, thus causing clearing of the μops in second shared latch 330 as the other thread progresses through the pipeline.

The outputs of first and second thread latches 340 may be coupled to a multiplexer 345, which may select an output from one of the latches for passing to a back end (pipestage 2 back end) pipestage 350, which may perform further processing on instructions. From back end pipestage 350, instructions may be provided to other locations within a processor pipeline, such as various execution units, storage buffers, for example, schedulers, reservation stations, or load and store buffers or other such structures. Of course, additional dedicated latches may be present within a given pipeline (e.g., in place of first shared latch 320 or second shared latch 330) to reduce the possible penalty of a clearing operation.

As further shown in FIG. 5, various control circuitry, which may include hardware, software, firmware or combinations thereof, may be coupled to different portions of pipeline 300 to enable control of thread switching, clearing and redispatch operations in accordance with an embodiment of the present invention. Specifically, as shown in FIG. 5 a controller 355 is present. In the embodiment of FIG. 5, additionally a first thread picker 360 and second thread picker 370 may also be present. Controller 355 may be coupled to various portions of pipeline 300 (not shown for ease of illustration in FIG. 5) to receive status information therefrom and made determinations as to whether a given thread has stalled within pipeline 300. Furthermore, controller 355 may implement thread switching, clearing and redispatch operations, such as those shown in the embodiments of FIGS. 2-4, based on the particular protocol for each pipestage depending on current thread, incoming thread, stalled state, etc.

In some embodiments, controller 355 may examine the actual thread ID and μop valid bits for a latch, and for the μops attempting to write into the latch, along with stall signals for a thread to make a clearing decision and to allow new μops to move into the latch. In other embodiments, the protocol can be applied locally at each latch, while controller 355 can infer the clearing decision (and thus direct the IDQ to adjust its pointers) by simply looking at the stall signals, keeping an internal track of which thread is in what latch, and applying the protocols. In the embodiment of FIG. 5, the IDQ may maintain two pointers in addition to the two read pointers (one per thread). The first pointer indicates which μops reside in first shared latch 320. Should sops be cleared from first shared latch 320, the read pointer for the thread that was cleared is restored to that of this first pointer. The second pointer indicates which μops reside in second shared latch 330, and acts similarly. When μops progress from second shared latch 330 to thread latch 340, they have cleared the shared portion of the pipeline, and the μops pointed to by the second pointer in the IDQ can be deallocated. As μops progress from first shared latch 320 to second shared latch 330, the second pointer is moved to indicate μops identified by the first pointer, and the first pointer is moved to indicate those μops just read from the IDQ.

In one embodiment, controller 355 may send signals to first thread picker 360, which in turn may control a selected one of queues 305 to output instructions to pipeline 300 via multiplexer 310. Furthermore, when a given thread has stalled within a pipestage of pipeline 300 and has been cleared, status information regarding the clearing may be sent to first thread picker 360, to influence it to not select a stalled thread. Furthermore, controller 305 may be coupled directly to queues 305 to enable a given queue 305 associated with the cleared instruction to adjust its pointers accordingly so that upon later clearing of the stall, appropriate instructions may be sent from queue 305. Referring still to FIG. 5, controller 355 may also send signaling to second thread picker 370, which may control which one of thread specific latches 340 is to output instructions to multiplexer 345. In other implementations, second thread picker 370 may send control instructions to control selection of an output of a given one of dedicated latches 340 from multiplexer 345.

In some implementations, controller 355 may operate such that a determination can be made upon a stall of a given thread whether to cause switching of threads being read out of the IDQ. That is, in some embodiments, controller 355 may determine the cause of the stall and, based on the type of stall, not switch threads if only a small number of cycles may be needed to resolve the stall. Thus, the μops for that thread remain stalled in the pipeline and will not be cleared by μops for the other thread progressing down the pipeline. Accordingly, some embodiments may include logic to determine a potential length of a stall. This length may in turn be compared to a threshold to determine whether switching of threads enables efficient forward progress or instead may impede such efficient operation of pipeline 300. Furthermore, controller 355 may actually change the protocol of a particular pipestage thus even preventing μops from an unstalled thread from overwriting and clearing μops from a stalled thread in a particular latch. Of course other heuristics may be used in determining whether to switch threads. Furthermore, while shown in the embodiment of FIG. 5 as including a separate controller and multiple thread pickers, it is to be understood the scope of the present invention is not limited in this regard and in many implementations, a single control logic to enable various operations in monitoring of status of pipeline 300 may be present.

Figure 6:
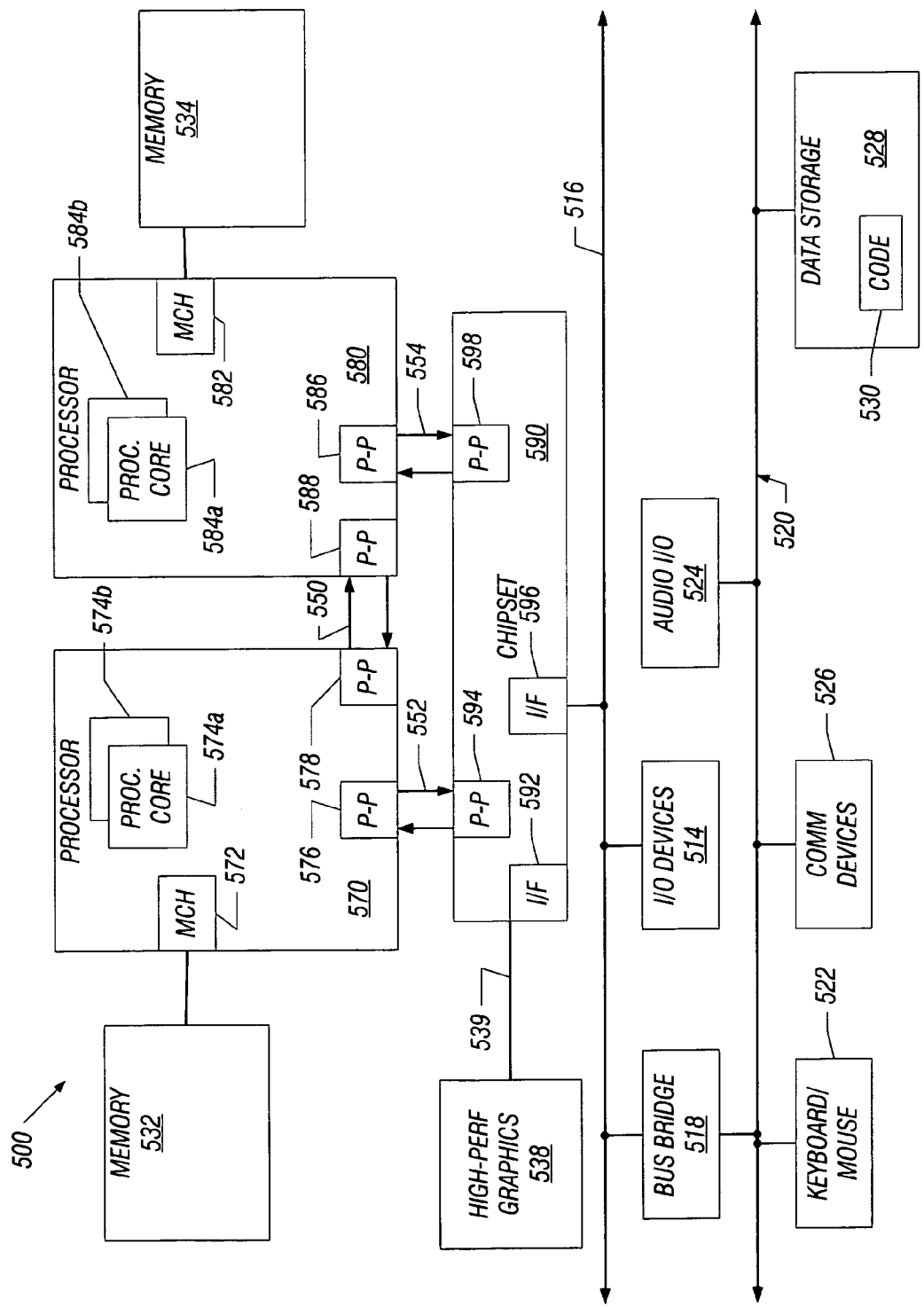
FIG. 6 is a block diagram of a multiprocessor system in accordance with one embodiment of the present invention.

Embodiments may be implemented in many different system types. Referring now to FIG. 6, shown is a block diagram of a system in accordance with an embodiment of the present invention. As shown in FIG. 6, multiprocessor system 500 is a point-to-point interconnect system, and includes a first processor 570 and a second processor 580 coupled via a point-to-point interconnect 550. As shown in FIG. 6, each of processors 570 and 580 may be multicore processors, including first and second processor cores (i.e., processor cores 574a and 574b and processor cores 584a and 584b). Note that each of the cores may include one or more pipelines having an architecture and which may operate in accordance with an embodiment of the present invention.

First processor 570 further includes point-to-point (P-P) interfaces 576 and 578. Similarly, second processor 580 includes P-P interfaces 586 and 588. As shown in FIG. 6, memory controller hubs (MCH's) 572 and 582 couple the processors to respective memories, namely a memory 532 and a memory 534, which may be portions of main memory locally attached to the respective processors.

First processor 570 and second processor 580 may be coupled to a chipset 590 via P-P interconnects 552 and 554, respectively. As shown in FIG. 6, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as a PCI Express™ bus or another third generation input/output (I/O) interconnect bus, although the scope of the present invention is not so limited.

As shown in FIG. 6, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Note that other architectures are possible. For example, instead of the point-to-point architecture of FIG. 6, a system may implement a multi-drop bus or another such architecture.

Embodiments may be implemented in code and may be stored on a machine-readable storage medium having stored thereon instructions which can be used to program a system to perform the instructions. The machine-readable storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. An apparatus comprising:
a first pipestage to process instructions;
a first shared buffer coupled to an output of the first pipestage to store instructions of a first thread or a second thread received from the first pipestage; and
a second pipestage coupled to an output of the first shared buffer to process instructions, the second pipestage having a front end stage, a first thread buffer to store at least one instruction of the first thread, a second thread buffer to store at least one instruction of the second thread and a back end stage, wherein an output of the front end stage of the second pipestage is to be provided to a selected one of the first and second thread buffers depending on whether the front end stage processed an instruction of the first thread or the second thread, the first thread buffer dedicated to the first thread and the second thread buffer dedicated to the second thread.

2. The apparatus of claim 1, further comprising a thread switcher to select an instruction of the second thread for processing in the second pipestage if an instruction of the first thread is stalled in the second pipestage.

3. The apparatus of claim 1, further comprising:
a first thread queue coupled to the first pipestage to store instructions of the first thread and to provide the instructions of the first thread to the first pipestage; and
a second thread queue coupled to the first pipestage to store instructions of the second thread and to provide the instructions of the second thread to the first pipestage.

4. The apparatus of claim 3, wherein the first thread queue includes a read pointer to point to a next instruction to be read from the first thread queue and a first shared buffer pointer to point to an instruction of the first thread that is stored in the first shared buffer.

5. The apparatus of claim 3, further comprising a storage coupled to the first thread queue to store a copy of the instructions of the first thread provided to the first pipestage and wherein the first thread queue is to update a read pointer to point to the storage when an instruction of the first thread is cleared from the first pipestage.

6. The apparatus of claim 1, wherein an instruction of the first thread is to be stored in the first thread buffer of the second pipestage, and wherein an instruction of the second thread is to be passed through the second thread buffer and processed in the second pipestage while the instruction of the first thread is stored in the first thread buffer.

7. The apparatus of claim 6, wherein the instruction of the first thread is to be provided from the first thread buffer to the second pipestage after a stall of the first thread is resolved.

8. The apparatus of claim 1, wherein the second pipestage includes:
the front end stage having an output coupled to the first thread buffer and the second thread buffer;
a multiplexer coupled to an output of the first thread buffer and the second thread buffer; and
the back end stage coupled to an output of the multiplexer.

9. The apparatus of claim 8, further comprising a detector to detect a stall in the first thread and to signal the second thread buffer to provide an instruction to the multiplexer.

10. The apparatus of claim 1, wherein the apparatus comprises an allocator coupled to an execution unit of a processor, wherein the allocator is to allocate resources to instructions performed in the execution unit.

11. The apparatus of claim 3, further comprising a controller to clear at least one instruction of the first thread from the apparatus and to signal the second thread queue to provide an instruction of the second thread to the first pipestage.

12. The apparatus of claim 11, wherein the controller is to re-dispatch the at least one instruction cleared from the apparatus after the first thread becomes unstalled.

13. A system comprising:
a first thread storage to store decoded instructions of a first thread;
a second thread storage to store decoded instructions of a second thread;
a first pipestage of a pipeline coupled to the first thread storage and the second thread storage;
a first shared buffer coupled to an output of the first pipestage to store instructions of the first thread or the second thread received from the first pipestage;
a second pipestage of the pipeline coupled to the first shared buffer;
a first dedicated buffer coupled, via a portion of another pipestage, to an output of the second pipestage to store an instruction of the first thread;
a second dedicated buffer coupled, via the portion of the another pipestage, to an output of the second pipestage to store an instruction of the second thread;
a controller coupled to at least the first thread storage, the second thread storage, the first shared buffer, the first dedicated buffer, and the second dedicated buffer to signal the first shared buffer to invalidate an instruction of the first thread if the first thread is stalled and to overwrite the instruction of the first thread in the first shared buffer with an instruction of the second thread while the instruction of the first thread is to remain stored in the first dedicated buffer; and
a dynamic random access memory (DRAM) coupled to the controller.

14. The system of claim 13, wherein the controller is to signal the second thread storage to output the instruction of the second thread to the pipeline if the instruction of the first thread is stalled in the pipeline.

15. The system of claim 14, wherein the controller is to invalidate at least one later instruction of the first thread, wherein the at least one later instruction of the first thread is located in an earlier portion of the pipeline than the stalled instruction of the first thread.

16. The system of claim 14, wherein the controller is to signal the first thread storage to redispatch the instruction of the first thread after the stall is resolved.

17. The system of claim 13, wherein the first thread storage comprises a read pointer to point to a next instruction to be read from the first thread storage and a plurality of pipeline location pointers each to point to an instruction of the first thread that is present in a corresponding location of the pipeline.

18. The system of claim 17, wherein the first thread storage is to update the read pointer to point to an instruction pointed to by a first one of the plurality of pipeline location pointers if the instruction pointed to by the first one of the plurality of pipeline location pointers is cleared from the corresponding location of the pipeline.

* * * * *